(12) United States Patent
Dai et al.

(10) Patent No.: US 11,205,284 B2
(45) Date of Patent: Dec. 21, 2021

(54) VEHICLE-MOUNTED CAMERA POSE ESTIMATION METHOD, APPARATUS, AND SYSTEM, AND ELECTRONIC DEVICE

(71) Applicant: BEIJING SENSETIME TECHNOLOGY DEVELOPMENT CO., LTD., Beijing (CN)

(72) Inventors: Xing Dai, Beijing (CN); Zhe Wang, Beijing (CN); Jianping Shi, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/748,785

(22) Filed: Jan. 21, 2020

(65) Prior Publication Data

US 2020/0160561 A1 May 21, 2020

Related U.S. Application Data

(63) Continuation of application No. PCT/CN2019/093911, filed on Jun. 28, 2019.

(30) Foreign Application Priority Data

Aug. 24, 2018 (CN) .......................... 201810973920.X

(51) Int. Cl.
*G06T 7/80* (2017.01)
*B60R 11/04* (2006.01)
*H04N 5/232* (2006.01)

(52) U.S. Cl.
CPC ................ *G06T 7/80* (2017.01); *B60R 11/04* (2013.01); *H04N 5/23229* (2013.01);
(Continued)

(58) Field of Classification Search
CPC ............ G06T 7/80; G06T 2207/30244; G06T 2207/30256; G06T 7/70; G06T 7/73;
(Continued)

(56) References Cited

U.S. PATENT DOCUMENTS

| 8,487,991 | B2 * | 7/2013 | Zhang | ............... | G06K 9/00798 |
| | | | | | 348/119 |
| 2010/0097455 | A1 * | 4/2010 | Zhang | ............... | G06K 9/00798 |
| | | | | | 348/119 |

(Continued)

FOREIGN PATENT DOCUMENTS

| CN | 106204574 A | 12/2016 |
| CN | 106875448 A * | 6/2017 |

(Continued)

OTHER PUBLICATIONS

CN108898638A (Machine Translation on Sep. 19, 2020) (Year: 2018).*

(Continued)

*Primary Examiner* — Michael Le
(74) *Attorney, Agent, or Firm* — Syncoda LLC; Feng Ma

(57) ABSTRACT

Vehicle-mounted camera pose estimation methods, apparatuses, and systems, and electronic devices involve performing lane line detection of a road on which a vehicle drives on the basis of a video stream of the road acquired by a vehicle-mounted camera; obtaining horizon information of the road on which the vehicle drives according to a lane line detection result; and obtaining pose information of the vehicle-mounted camera according to the horizon information.

18 Claims, 12 Drawing Sheets

(52) U.S. Cl.
CPC ... *B60R 2300/402* (2013.01); *B60R 2300/804* (2013.01); *G06T 2207/30244* (2013.01); *G06T 2207/30256* (2013.01)

(58) Field of Classification Search
CPC .............. B60R 11/04; B60R 2300/402; B60R 2300/804; H04N 5/23229; H04N 7/183; H04N 17/002; G06K 9/00; G06K 9/00798; G06K 9/52
See application file for complete search history.

(56) References Cited

U.S. PATENT DOCUMENTS

| | | | |
|---|---|---|---|
| 2014/0355879 A1* | 12/2014 | Agosta | G06T 7/143 |
| | | | 382/170 |
| 2015/0279017 A1* | 10/2015 | Tamura | G06K 9/00798 |
| | | | 382/103 |
| 2017/0122762 A1* | 5/2017 | van der Molen | G01C 21/32 |
| 2018/0056873 A1* | 3/2018 | Lee | G06T 7/73 |
| 2018/0322655 A1 | 11/2018 | Nagai et al. | |
| 2018/0324415 A1* | 11/2018 | Bovyrin | G06K 9/00818 |
| 2019/0205664 A1* | 7/2019 | Duan | G06K 9/38 |
| 2020/0293797 A1* | 9/2020 | Liu | G06K 9/2054 |

FOREIGN PATENT DOCUMENTS

| | | | | |
|---|---|---|---|---|
| CN | 106875448 | A | | 6/2017 |
| CN | 107133985 | A | | 9/2017 |
| CN | 107730551 | A | | 2/2018 |
| CN | 108367710 | A | | 8/2018 |
| CN | 108450058 | A | | 8/2018 |
| CN | 108875603 | A | * | 11/2018 ........... G06K 9/6271 |
| CN | 108898638 | A | * | 11/2018 |
| CN | 108898638 | A | | 11/2018 |
| JP | 2007034989 | A | | 2/2007 |
| JP | 2010537331 | A | | 12/2010 |
| JP | 2011022995 | A | | 2/2011 |

OTHER PUBLICATIONS

CN106875448A (Machine Translation on Sep. 19, 2020) (Year: 2017).*

Ma, Lin et al., "Dynamic Approach of Camera Auto-Calibration for Vision System on Autonomous Vehicle", Journal of Xi'an Jiaotong University, vol. 39, No. 10, Oct. 31, 2005 (Oct. 31, 2005), abstract, and pp. 1073-1075.

International Search Report in the international application No. PCT/CN2019/093911, dated Sep. 27, 2019.

English translation of the Written Opinion of the International Search Authority in the international application No. PCT/CN2019/093911, dated Sep. 27, 2019.

First Office Action of the Japanese application No. 2020-510614, dated Apr. 1, 2021.

* cited by examiner

VEHICLE-MOUNTED CAMERA POSE ESTIMATION METHOD, APPARATUS, AND SYSTEM, AND ELECTRONIC DEVICE

CROSS-REFERENCE TO RELATED APPLICATIONS

The present application is a continuation of International Application No. PCT/CN2019/093911, filed on Jun. 28, 2019, which claims priority to Chinese Patent Application No. 201810973920.X, filed on Aug. 24, 2018. The disclosures of these applications are incorporated herein by reference in their entirety.

BACKGROUND

An intelligent driving system, such as an Advanced Driver Assistant System (ADAS) or an unmanned driving system, senses the surrounding environment in real time during the driving of a vehicle (an automobile, an electric vehicle, a train, etc.) by using various sensors mounted on the vehicle, so as to assist a driver in controlling the vehicle and pre-warn the driver about a possible danger, so that the safety and comfortableness of the driver during driving are improved.

SUMMARY

The present disclosure relates to the technical field of intelligent driving, and in particular, relates to vehicle-mounted camera pose estimation methods, apparatuses, and systems, and electronic devices.

Embodiments of the present disclosure provide technical solutions of vehicle-mounted camera pose estimation and application thereof.

In a first aspect, the embodiments of the present disclosure provide a vehicle-mounted camera pose estimation method, including:

performing lane line detection of a road on which a vehicle drives on the basis of a video stream of the road acquired by a vehicle-mounted camera;

obtaining horizon information of the road according to a lane line detection result; and obtaining pose information of the vehicle-mounted camera according to the horizon information.

In a second aspect, the embodiments of the present disclosure further provide a vehicle-mounted camera pose estimation apparatus, including:

a lane line detection module, configured to perform lane line detection of a road on which a vehicle drives on the basis of a video stream of the road acquired by a vehicle-mounted camera;

a horizon information obtaining module, configured to obtain horizon information of the road according to a lane line detection result; and a pose information obtaining module, configured to obtain pose information of the vehicle-mounted camera according to the horizon information.

In a third aspect, the embodiments of the present disclosure provide an electronic device, including:

a memory, configured to store executable instructions; and a processor, configured to call and execute the executable instructions in the memory to execute operations of the method according to any one of feasible implementations of the first aspect.

In a fourth aspect, the embodiments of the present disclosure provide a non-transitory readable storage medium, in which computer-readable instructions are stored, where execution of the computer-readable instructions by a processor causes the processor to execute the operations of the method according to any one of the feasible implementations of the first aspect.

In a fifth aspect, the embodiments of the present disclosure provide a vehicle-mounted camera pose estimation system, applied to a vehicle, and including a camera mounted on the vehicle and the vehicle-mounted camera pose estimation apparatus according to any one of feasible implementations of the second aspect and communicatively connected to the camera.

In a sixth aspect, the embodiments of the present disclosure further provide a computer program product, including a computer instruction. When the computer instruction is run in a processor of a device, the operations of the method according to any one of the feasible implementations of the first aspect are implemented.

BRIEF DESCRIPTION OF THE DRAWINGS

To describe the technical solutions in embodiments of the present invention or the prior art more clearly, the accompanying drawings required for describing the embodiments or the prior art are briefly introduced below. Apparently, the accompanying drawings in the following description show some embodiments of the present disclosure, and a person of ordinary skill in the art can still derive other accompanying drawings from these accompanying drawings without creative efforts.

DETAILED DESCRIPTION

In an ADAS, a vehicle-mounted camera is used as a main sensor, so that data acquired by the vehicle-mounted camera is especially important. The vehicle-mounted camera usually works with a specific pose, and the data acquired by the vehicle-mounted camera is data acquired under the specific pose, and the vehicle-mounted camera may shake during vehicle driving and the vehicle-mounted camera may be detached and mounted during the maintenance of the vehicle-mounted camera, which may both cause the pose of the vehicle-mounted camera to change.

The embodiments of the present disclosure provide a vehicle-mounted camera pose estimation method and apparatus, including: performing lane line detection of a road on which a vehicle drives on the basis of a video stream of the road acquired by a vehicle-mounted camera; obtaining horizon information of the road on which the vehicle drives according to a lane line detection result; and obtaining pose information of the vehicle-mounted camera according to the horizon information. The position of the vehicle-mounted camera in the vehicle-mounted camera pose estimation method provided by the embodiments of the present disclosure does not need to be fixed, and a pose of the camera can be obtained in real time. Therefore, the pose estimation accuracy of the vehicle-mounted camera is improved.

To describe the purpose, the technical solutions, and the advantages of embodiments of the present disclosure more clearly, the technical solutions of the embodiments of the present disclosure are clearly and fully described below with reference to the accompanying drawings in the embodiments of the present disclosure. Apparently, the described embodiments are some of the embodiments of the present disclosure rather than all the embodiments. Based on the embodiments of the present disclosure, all other embodiments obtained by a person of ordinary skill in the art without involving an inventive effort shall fall within the scope of protection of the present disclosure.

The execution subject of a vehicle-mounted camera pose estimation method of the embodiments of the present disclosure may be an electronic device such as a terminal device or a server, where the terminal device is a User Equipment (UE), a mobile device, a user terminal, a terminal, a cellular phone, a cordless phone, a Personal Digital Assistant (PDA), a handheld device, a computing device, a vehicle-mounted camera, other vehicle-mounted devices that are not a camera, a wearable device, and the like. In some possible implementations, the pose estimation method is implemented by a processor by calling a computer readable instruction stored in a memory.

Figure 1:
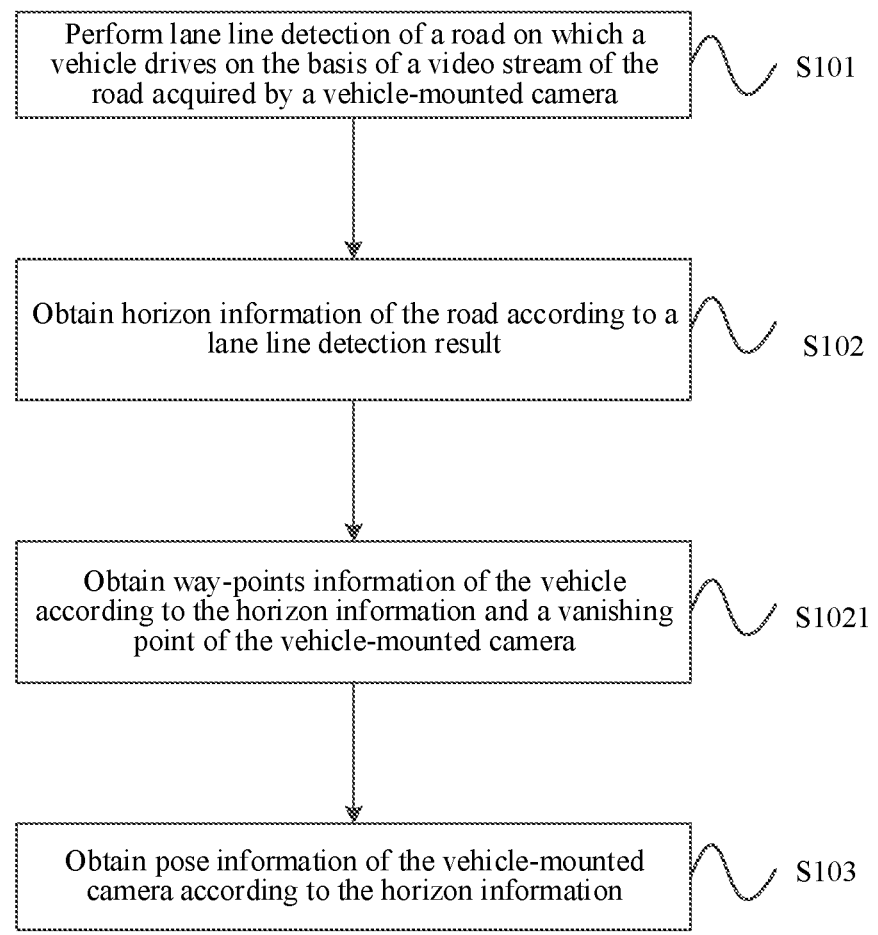
FIG. 1 is a schematic flowchart of a vehicle-mounted camera pose estimation method provided by one or more embodiments of the present disclosure.

FIG. 1 is a schematic flowchart of a vehicle-mounted camera pose estimation method provided by embodiment I of the present disclosure. In this embodiment, lane line detection is performed on images captured by a vehicle-mounted camera, lane line information within the images is determined according to a lane line detection result, and then a pose of the camera is obtained according to the lane line information within each image. Thus, the amount of computation is less and the requirement for the position of the camera is lowered.

As illustrated in FIG. 1, the vehicle-mounted camera pose estimation method provided by the embodiments of the present disclosure includes the following operations.

At S101, lane line detection of a road on which a vehicle drives is performed on the basis of a video stream of the road acquired by a vehicle-mounted camera.

Figure 2:
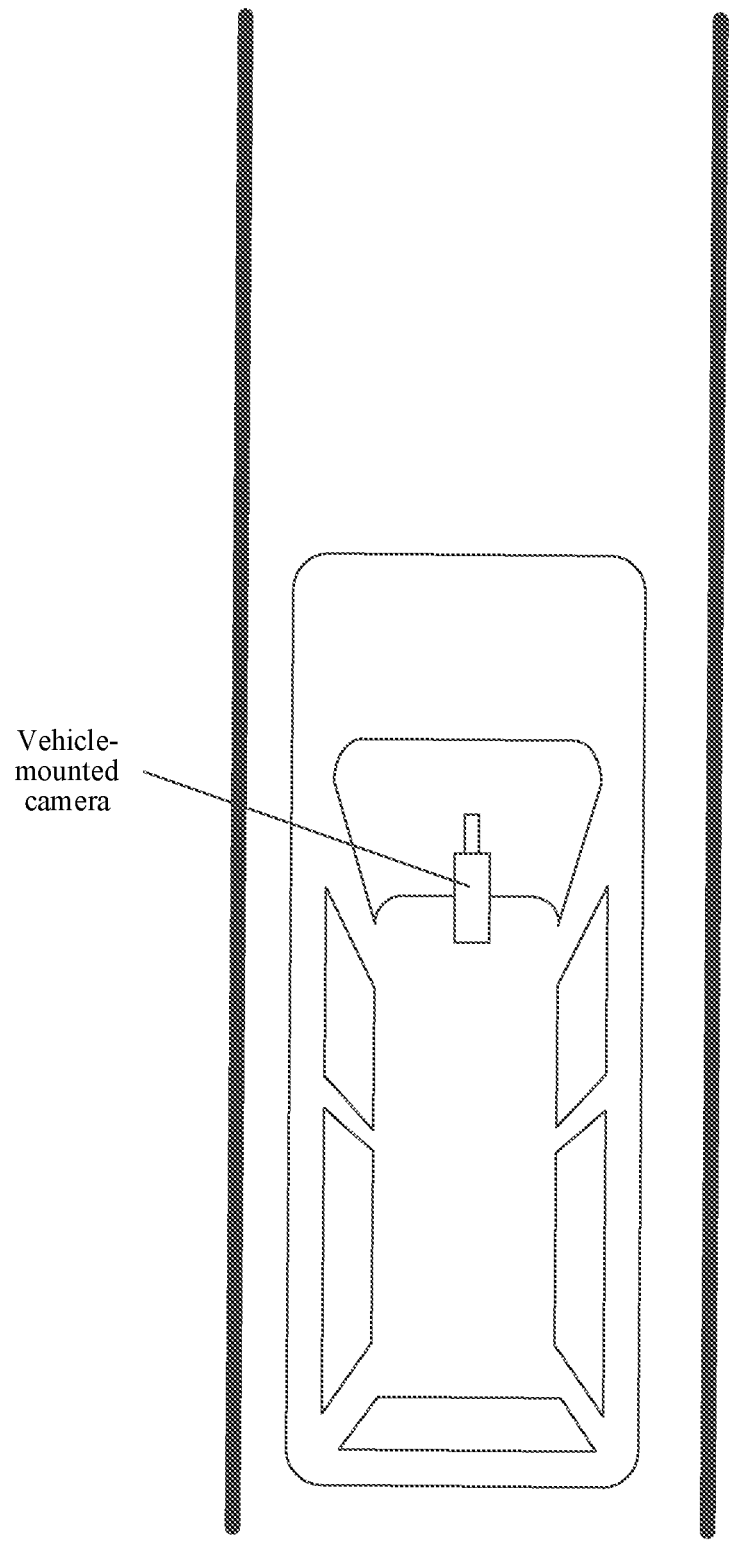
FIG. 2 is an example of an application scenario suitable for the embodiments of the present disclosure.

Exemplarily, this embodiment is applied to a vehicle in which a vehicle-mounted camera is mounted, and the vehicle-mounted camera is capable of photographing road information. FIG. 2 is an example of an application scenario suitable for the embodiments of the present disclosure. As illustrated in FIG. 2, when a vehicle drives on a road, a vehicle-mounted camera provided at the front of the vehicle photographs the road, and the vehicle-mounted camera acquires a video stream of the road on which the vehicle drives, the video stream including at least one frame of image. Exemplarily, the vehicle-mounted camera in the embodiments of the present disclosure is mounted at any position on front windshield glass of the vehicle.

In some embodiments, the road in the embodiments of the present disclosure is a structured road. The structured road generally refers to a road that is well structured, such as a highway and an urban main road. Such a road has a road marker line such as a lane line, the background environment of the road is relatively simple, and the geometric feature of the road is also obvious. An unstructured road generally refers to a road that is less structured, such as an urban non-main road and a country street. Such a road has no lane lines and/or clear road boundaries, and a road area and a non-road area are difficult to be distinguished under the influences of shadows and water marks. By applying the technical solutions provided by the embodiments of the present disclosure on a structured road, the pose estimation of the vehicle-mounted camera is good in effect and accurate in result.

In some embodiments, after being estimated, the pose of the vehicle-mounted camera is used in various application scenarios, such as positioning, navigation, and road scene restoration of a vehicle-mounted device.

In some embodiments, a process of determining that a vehicle drives on a structured road specifically includes the following operations:

lane line detection of a road on which a vehicle drives is performed on the basis of a video stream of the road acquired by a vehicle-mounted camera; and if there is an image including at least two lane lines in the video stream, it is determined that the vehicle drives on a structured road.

Exemplarily, when a vehicle drives on a road and a vehicle-mounted camera is turned on to start photographing, lane line detection of the road is performed on an image captured by the camera, and when a certain frame of image is detected to include at least two lane lines, it is determined that the vehicle drives on a structured road. In some embodiments, when a certain frame of image is detected to include at least two lane lines adjacent to the vehicle, it is determined that the vehicle drives on a structured road.

Exemplarily, the lane line detection result includes lane line information.

In some embodiments, the lane line information is information of two lane lines at the left and right sides of the vehicle or information of any two lane lines on the road. The two lane lines may be straight lane lines or curved lane lines, which is not limited by the embodiments of the present disclosure.

The lane line information is expressed by means of a lane line function, and the process of obtaining the lane line information is described in the following embodiments.

At S102, horizon information of the road on which the vehicle drives is obtained according to a lane line detection result.

Exemplarily, the horizon information is a horizon function in an image captured by a vehicle-mounted camera.

In some embodiments, a feasible method for obtaining horizon information includes the following operations.

At S11, lane lines fitting are performed according to the lane line detection result to obtain lane line information of at least two lane lines of the road.

Figure 3:
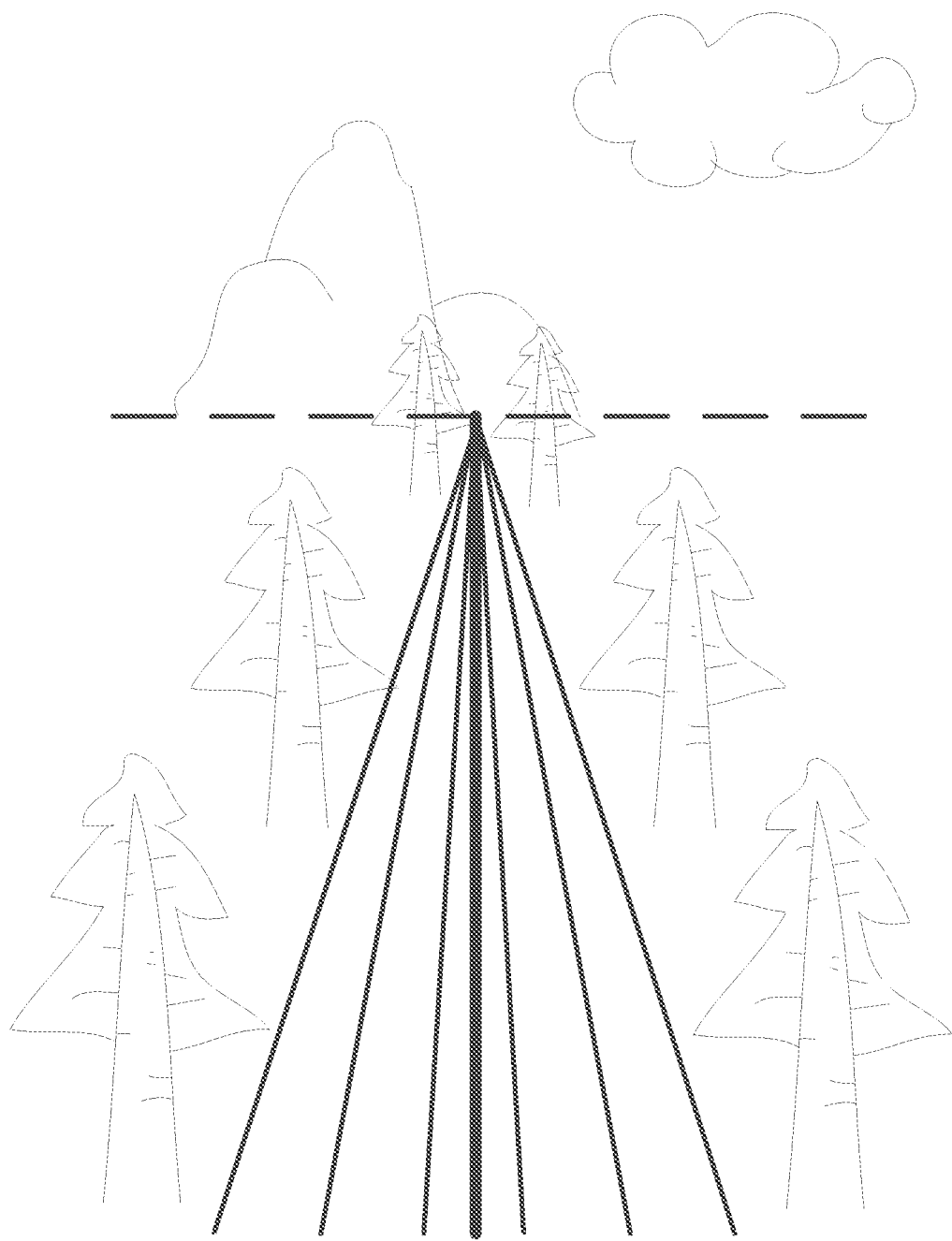
FIG. 3 is a schematic diagram I of an image captured by a vehicle-mounted camera in the embodiments of the present disclosure.
Figure 4:
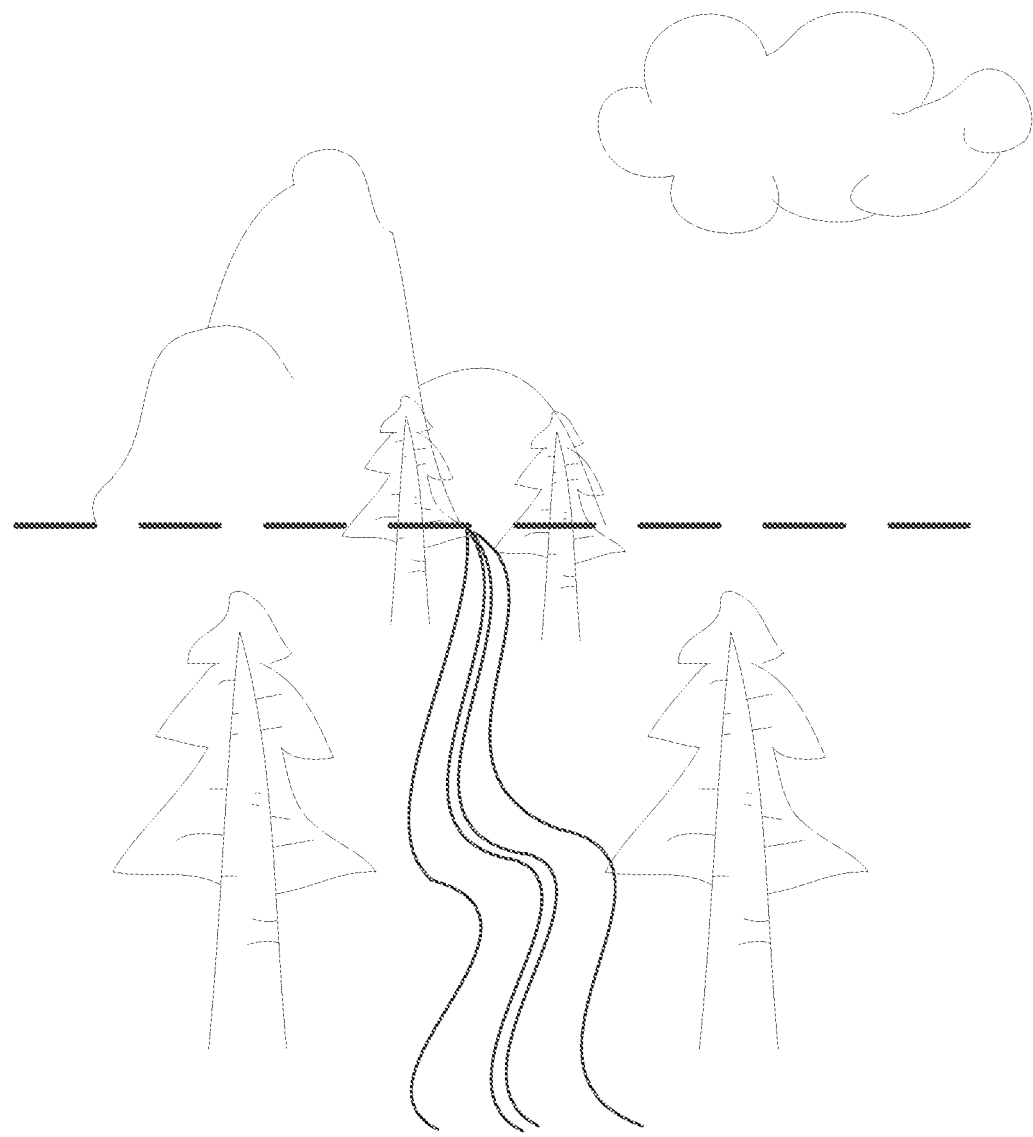
FIG. 4 is a schematic diagram II of an image captured by a vehicle-mounted camera in the embodiments of the present disclosure.

Exemplarily, for each of at least two frames of images in a video stream acquired by a vehicle-mounted camera, lane line functions corresponding to at least two lane lines in the image are obtained. FIG. 3 is a schematic diagram I of an image captured by a vehicle-mounted camera in the embodiments of the present disclosure. FIG. 4 is a schematic diagram II of an image captured by a vehicle-mounted camera in the embodiments of the present disclosure. As illustrated in FIG. 3 and FIG. 4, detection is performed on an image by means of an algorithm such as feature extraction, and lane lines in the image are obtained. The lane lines are generally straight lines as illustrated in FIG. 3 and curves as illustrated in FIG. 4. Exemplarily, the upper left corner of the image is taken as a coordinate origin, and the lane line functions of the lane lines in the image are fitted.

In some embodiments, the obtaining lane line functions corresponding to the at least two lane lines in the image specifically includes the following operations.

At S111, lane line pixel points belonging to the lane lines are obtained according to the lane line detection result.

Exemplarily, in consideration of the characteristics of the lane lines, i.e., being continuous and usually being straight lines and curves, an image segmentation algorithm, a feature extraction algorithm, a convolutional neural network algorithm, and the like may be used for detecting lanes in the image, and the lane line pixel points belonging to the lane lines are marked in the image according to a detection result.

At S112, the lane lines fitting are performed according to the lane line pixel points to obtain the lane line information of the at least two lane lines of the road.

Exemplarily, after the lane line pixel points belonging to the lane lines in the image are determined, a curve function fitting process is performed on the lane line pixel points in the image by using OpenCV, so as to obtain lane line functions of all the lane lines in the image. Exemplarily, for a straight lane line, the lane line function is usually a linear function.

At S12, a vanishing-point of the lane lines is obtained according to the lane line information of the at least two lane lines.

Exemplarily, according to a perspective principle, the lane lines intersect at the horizon. Therefore, the vanishing-point of the lane line functions falls on the horizon. Coordinates of the vanishing-point within the image are obtained according to the lane line functions. Exemplarily, when the lane lines are curves, a point of the lane line functions within a pixel coordinate range of the image is used as a vanishing-point of the lane line functions.

At S13, the horizon information is obtained according to the vanishing-point of the lane lines.

Exemplarily, in consideration of the vanishing-point of the lane lines being located on the horizon, a horizon function is obtained according to the vanishing-point within each frame of image.

Exemplarily, on the basis of this embodiment, after the horizon information is obtained in S102, the pose estimation of the vehicle-mounted camera further includes the following operations.

At S1021, way-points information of the vehicle is obtained according to the horizon information and a vanishing-point of the vehicle-mounted camera.

Exemplarily, the way-points information is a way-points function. The vanishing-point moves with the angle of view of the vehicle-mounted camera, and the vanishing-point of the vehicle-mounted camera indicates a road vanishing-point of the way-points captured by the vehicle-mounted camera. According to the perspective principle, since the vehicle driving way-points are vertical to the horizon, and the vanishing-point of the vehicle-mounted camera in the image is located on the vehicle driving way-points, a vehicle driving way-points function may be obtained according to the obtained horizon function and vanishing-point in the image.

At S103, the pose information of the vehicle-mounted camera is obtained according to the horizon information.

Exemplarily, the pose information of the vehicle-mounted camera includes at least one of the following: a rotation angle, a pitch angle, and a horizontal deviation angle of the vehicle-mounted camera.

Exemplarily, with the change of the pose of the vehicle-mounted camera, the horizon and way-points in the image captured by the vehicle-mounted camera are different, and therefore, the pose of the vehicle-mounted camera is obtained according to the horizon information and way-points information obtained.

Exemplarily, the rotation angle of the vehicle-mounted camera is specifically determined according to slope information of the horizon. The horizontal deviation angle of the vehicle-mounted camera is obtained according to the way-points information. The pitch angle of the vehicle-mounted camera is obtained according to the horizon information.

The embodiments of the present disclosure provide a vehicle-mounted camera pose estimation method and apparatus, including: performing lane line detection of a road on which a vehicle drives on the basis of a video stream of the road acquired by a vehicle-mounted camera; obtaining horizon information of the road on which the vehicle drives according to a lane line detection result; and obtaining pose information of the vehicle-mounted camera according to the horizon information. The position of the vehicle-mounted camera in the vehicle-mounted camera pose estimation method provided by the embodiments of the present disclosure does not need to be fixed, and a pose of the camera can be obtained in real time. Therefore, the pose estimation accuracy of the vehicle-mounted camera is improved.

Exemplarily, the solutions involved in the embodiments may be applied to an intelligent driving scenario. For example, in an assistant driving or automatic driving scenario, by obtaining the accurate pose of the vehicle-mounted camera in real time, the safety of assistant driving or automatic driving may be improved. Exemplarily, after the pose information of the camera is obtained, the positioning, navigation, scenario restoration, and the like of the vehicle are further performed according to the pose information of the vehicle-mounted camera.

Figure 5:
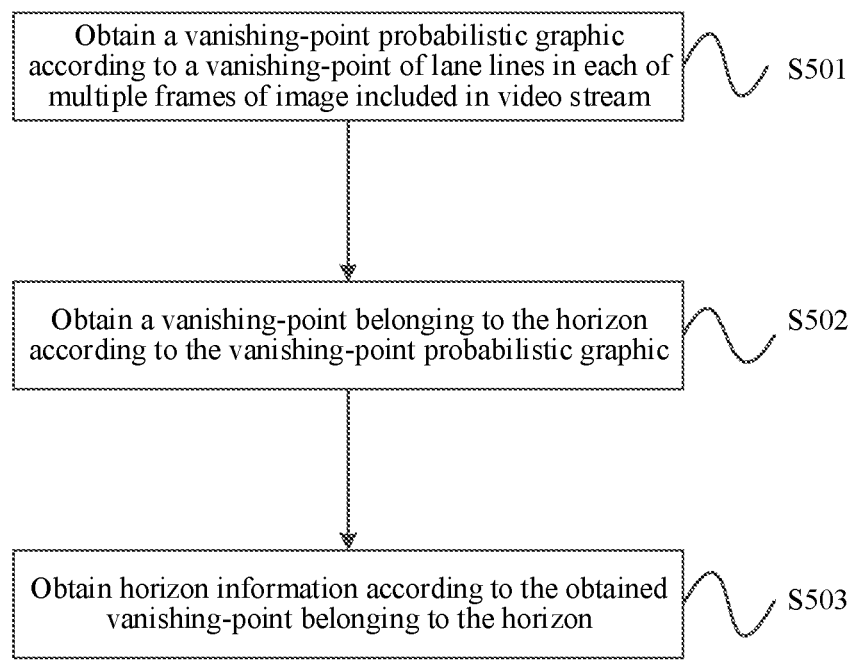
FIG. 5 is a schematic flowchart of a vehicle-mounted camera pose estimation method provided by one or more embodiments of the present disclosure.

Exemplarily, on the basis of the embodiments above, the embodiments of the present disclosure further provide a vehicle-mount camera pose estimation method. FIG. 5 is a schematic flowchart of a vehicle-mounted camera pose estimation method provided by embodiment II of the present disclosure. In this embodiment, the process of obtaining horizon information according to the vanishing-point of the lane lines is explained in detail. As illustrated in FIG. 5, the obtaining the horizon information according to the vanishing-point of the lane lines includes the following operations.

At S501, a vanishing-point probabilistic graphic is obtained according to the vanishing-point of the lane lines in each of multiple frames of images included in the video stream.

Exemplarily, for N frames of images of the multiple frames of images included in the video stream, statistics about pixel coordinates of the vanishing-point within each frame of image are collected, the vanishing-point probabilistic graphic is obtained according to the pixel coordinates of the vanishing-points within the N frames of images, and the value of each pixel point in the vanishing-point probabilistic graphic is the number of images, with the vanishing-point located at the pixel point, within the N frames of images, where N is a positive integer greater than 1.

At S502, a vanishing-point belonging to the horizon is obtained according to the vanishing-point probabilistic graphic.

Exemplarily, after the vanishing-point probabilistic graphic is obtained, a density-based clustering algorithm is used to remove outliers, and determine the vanishing-point belonging to the horizon in the vanishing-point probabilistic graphic.

At S503, the horizon information is obtained according to the obtained vanishing-point belonging to the horizon.

Exemplarily, after the vanishing-point belonging to the horizon is obtained, a horizon function is constructed according to the coordinates of each vanishing-point, and the horizon function is a linear function. Exemplarily, in a possible implementation, the upper left corner of the image is taken as a coordinate origin, and the horizon function is Y=100. In this case, the horizon in the image is a horizontal line.

Exemplarily, in this embodiment, based on the perspective principle, in consideration of the vanishing-point of the lane lines being located on the horizon, the horizon information is determined according to the vanishing-point of the lane lines within each image. Thus, the manner of obtaining the horizon information is simplified, and the amount of computation for the pose estimation of the vehicle-mounted camera is reduced.

In some embodiments, on the basis of any of the embodiments above, the manner of obtaining the vanishing-point may exemplarily be: obtaining the vanishing-point of the vehicle-mounted camera by performing averaging processing on the obtained vanishing-points belonging to the horizon.

Exemplarily, according to the perspective principle, in consideration of the vanishing-point being located on the horizon, the horizontal and vertical coordinates of each vanishing-point are respectively averaged according to the coordinates of the vanishing-point belonging to the horizon, so as to determine the horizontal and vertical coordinates of the vanishing-point, thereby obtaining the vanishing-point.

Figure 6:
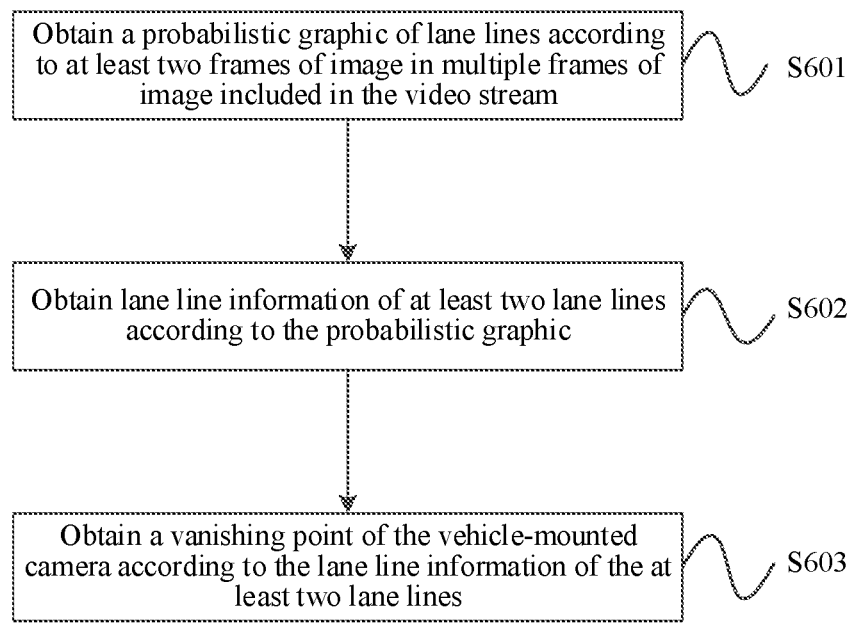
FIG. 6 is a schematic flowchart of a vehicle-mounted camera pose estimation method provided by one or more embodiments of the present disclosure.

On the basis of any of the embodiments above, the manner of obtaining the vanishing-point may also be exemplified as illustrated in FIG. 6, in which the process of obtaining the vanishing-point includes the following operations.

At S601, a probability image of the lane lines is obtained according to at least two frames of images in multiple frames of images included in the video stream.

The value of each pixel point in the probability image indicates the probability of the pixel point belonging to the lane line.

Exemplarily, in a possible implementation, for N frames of images, in consideration of the number of straight lane lines being far more than the number of curved lane lines, a probability image of the straight lane lines is obtained according to statistics collection. The value of each pixel point in the probability image indicates the probability of the pixel point belonging to a lane line. In some embodiments, the value of each pixel point in the probability image further indicates the number of times that the pixel point belongs to a lane line in the N frames of images.

At S602, the lane line information of at least two lane lines is obtained according to the probability image.

Exemplarily, pixel points belonging to the lane lines are determined in the probability image, and the functions of the lane lines can be fitted according to the pixel points belonging to the lane lines.

At S603, a vanishing-point of the vehicle-mounted camera is obtained according to the lane line information of the at least two lane lines.

Exemplarily, according to the perspective principle, the vanishing-point of the functions of the lane lines is obtained as a vanishing-point.

Exemplarily, in this embodiment, based on the perspective principle, in consideration of the vanishing-point of the lane lines being a vanishing-point, the probability image is obtained by collecting statistics on the basis of the multiple frames of images so as to determine lane line functions, and then a vanishing-point is obtained according to the vanishing-point of the lane lines. The manner of obtaining the vanishing-point is simplified, and the amount of computation for the pose estimation of the vehicle-mounted camera is reduced.

In some embodiments, on the basis of any of the embodiments above, the obtaining the pitch angle of the vehicle-mounted camera according to the horizon function specifically includes the following operation:

the pitch angle of the vehicle-mounted camera is obtained according to the horizon information and the focal length of the vehicle-mounted camera.

Exemplarily, according to a distance from the pixel point of the main optical axis of the vehicle-mounted camera mapped in the image to the horizon function and the focal length of the vehicle-mounted camera, the pitch angle of the vehicle-mounted camera is obtained.

Exemplarily, a distance D1 from the pixel point of the main optical axis of the vehicle-mounted camera mapped in the image to the horizon function is obtained, and the pitch angle of the vehicle-mounted camera is obtained according to arc $\tan(D1/(f*PM))$, where f is the focal length of the vehicle-mounted camera, PM is an intrinsic parameter of the image acquired by the vehicle-mounted camera, and the unit of the intrinsic parameter is pixels/millimeter, indicating the number of pixels per millimeter that can be imaged on an imaging element.

Figure 7:
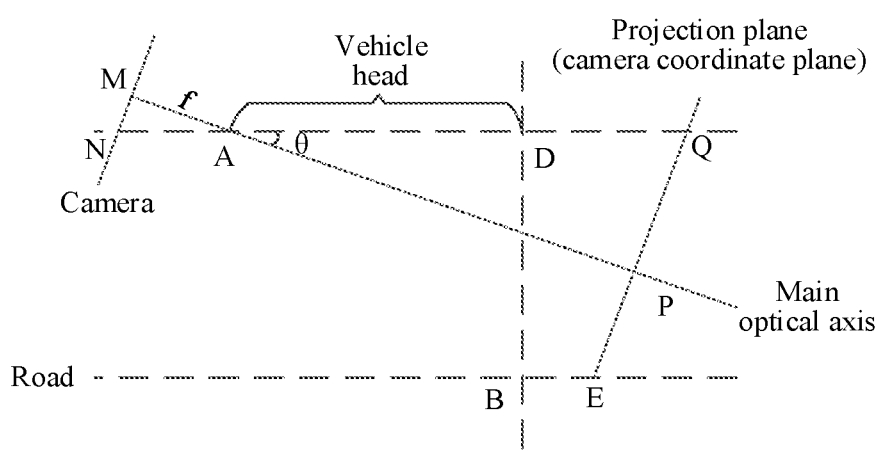
FIG. 7 is a schematic diagram of a principle of pitch angle estimation of a vehicle-mounted camera provided by the embodiments of the present disclosure.

FIG. 7 is a schematic diagram of a principle of pitch angle estimation of a vehicle-mounted camera provided by the embodiments of the present disclosure. FIG. 7 is a side view of a vehicle driving on a road. As illustrated in FIG. 7, BE is a road on which a vehicle drives, BD is vertical to the ground, AD is parallel to the ground, and the dotted line of AD indicates a line parallel to the ground and having the same height as the camera. MA is f, i.e., the focal length of the vehicle-mounted camera. MN is the size of the imaging element in the camera. θ is the pitch angle of the vehicle-mounted camera, and tan θ=MN/f. Moreover, a pixel point of the main optical axis of the vehicle-mounted camera mapped in the image is point P, PQ is the distance D1 from the pixel point of the main optical axis of the vehicle-mounted camera mapped in the image to the horizon function, the unit of D1 is pixel, and MN=PQ/PM.

Exemplarily, the obtaining the horizontal deviation angle of the vehicle-mounted camera according to the way-points information includes the following operation:

the horizontal deviation angle of the vehicle-mounted camera is obtained according to the way-points information and the focal length of the vehicle-mounted camera.

Exemplarily, according to the distance from the pixel point of the main optical axis of the vehicle-mounted camera mapped in the image to the way-points function and the focal length of the vehicle-mounted camera, the horizontal deviation angle of the vehicle-mounted camera is obtained.

Exemplarily, a distance D2 from the pixel point of the main optical axis of the vehicle-mounted camera mapped in the image to the way-points function is obtained, and the horizontal deviation angle of the vehicle-mounted camera is obtained according to arc $\tan(D2/(f*PM))$.

Figure 8:
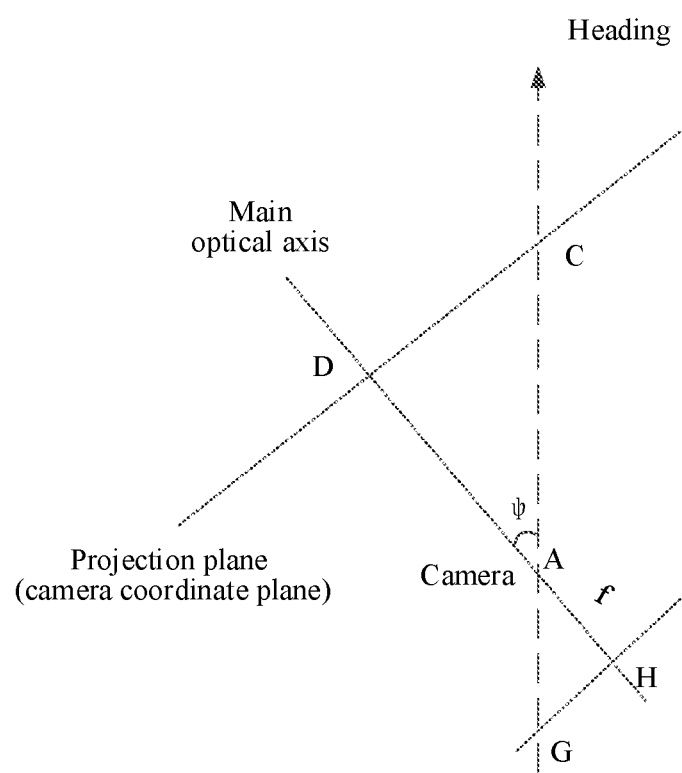
FIG. 8 is a schematic diagram of a principle of horizontal deviation angle estimation of a vehicle-mounted camera provided by the embodiments of the present disclosure.

Exemplarily, FIG. 8 is a schematic diagram of a principle of a horizontal deviation angle estimation method for a vehicle-mounted camera provided by the embodiments of the present disclosure. FIG. 8 is a top view of a vehicle driving on a road. As illustrated in FIG. 8, $\Psi$ is the horizontal deviation angle of the vehicle-mounted camera, GAC is the heading of a vehicle, and $\tan \omega = GH/f$, where GH is the size of the imaging element in the camera, and GH=CD/PM. The pixel point of the main optical axis of the vehicle-mounted camera mapped in the image is point D, CD is the distance D2 from the pixel point of the main optical axis of the vehicle-mounted camera mapped in the image to the way-points function, and f is the focal length of the vehicle-mounted camera.

Exemplarily, the obtaining the pose information of the vehicle-mounted camera according to the horizon information includes the following operation:

the rotation angle of the vehicle-mounted camera is determined according to the slope information of the horizon.

Exemplarily, the horizon function is a linear function in the image. When the vehicle-mounted camera does not rotate, the horizon function is a horizontal straight line. When the vehicle-mounted camera rotates, the slope of the horizon function may indicate the rotation angle of the vehicle-mounted camera.

Figure 9:
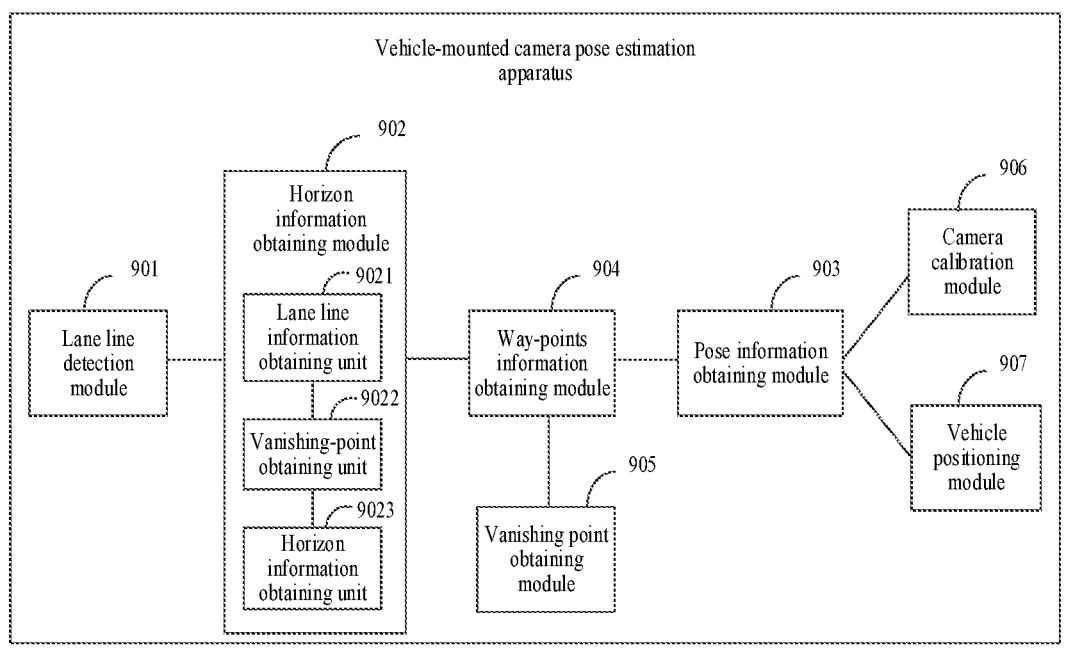
FIG. 9 is a schematic structural diagram of a vehicle-mounted camera pose estimation apparatus provided by the embodiments of the present disclosure.

Another aspect of the embodiments of the present disclosure further provides a vehicle-mounted camera pose estimation apparatus. FIG. 9 is a schematic structural diagram of a vehicle-mounted camera pose estimation apparatus provided by the embodiments of the present disclosure. As illustrated in FIG. 9, the vehicle-mounted camera pose estimation apparatus includes:

a lane line detection module 901, configured to perform lane line detection of a road on which a vehicle drives on the basis of a video stream of the road acquired by a vehicle-mounted camera;

a horizon information obtaining module 902, configured to obtain horizon information of the road on which the vehicle drives according to a lane line detection result; and a pose information obtaining module 903, configured to obtain pose information of the vehicle-mounted camera according to the horizon information.

The embodiments of the present disclosure provide a vehicle-mounted camera pose estimation method and apparatus, including: performing lane line detection of a road on which a vehicle drives on the basis of a video stream of the road acquired by a vehicle-mounted camera; obtaining horizon information of the road on which the vehicle drives according to a lane line detection result; and obtaining pose information of the vehicle-mounted camera according to the horizon information. The position of the vehicle-mounted camera in the vehicle-mounted camera pose estimation method provided by the embodiments of the present disclosure does not need to be fixed, and a pose of the camera can be obtained in real time. Therefore, the pose estimation accuracy of the vehicle-mounted camera is improved.

In some embodiments, the road is a structured road, and/or the vehicle-mounted camera is mounted at any position on front windshield glass of the vehicle.

The road in the embodiments of the present disclosure is a structured road. The structured road generally refers to a road that is well structured, such as a highway and an urban main road. Such a road has a road marker line such as a lane line, the background environment of the road is relatively simple, and the geometric feature of the road is also obvious. An unstructured road generally refers to a road that is less structured, such as an urban non-main road and a country street. Such a road has no lane lines and/or clear road boundaries, and a road area and a non-road area are difficult to be distinguished under the influences of shadows and water marks. By applying the technical solutions provided by the embodiments of the present disclosure on a structured road, the pose estimation of the vehicle-mounted camera is good in effect and accurate in result.

In some embodiments, the pose information of the vehicle-mounted camera includes a rotation angle of the vehicle-mounted camera.

Figure 10:
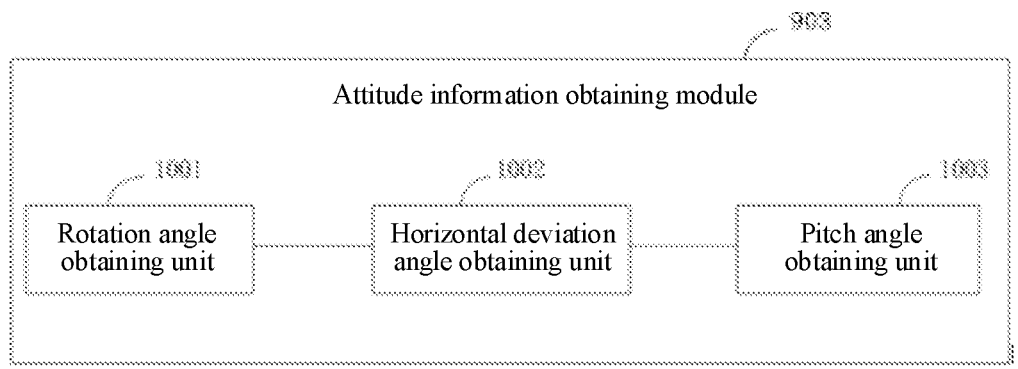
FIG. 10 is a schematic structural diagram of a pose information obtaining module provided by the embodiments of the present disclosure.

Exemplarily, as illustrated in FIG. 9 and FIG. 10, the pose information obtaining module 903 further includes:

a rotation angle obtaining unit 1001, configured to determine the rotation angle of the vehicle-mounted camera according to slope information of the horizon.

In some embodiments, the pose information of the vehicle-mounted camera further includes a horizontal deviation angle of the vehicle-mounted camera.

As illustrated in FIG. 9, the vehicle-mounted camera pose estimation apparatus further includes: a way-points information obtaining module 904, configured to obtain the way-points information of the vehicle according to the horizon information.

In some embodiments, as illustrated in FIG. 9 and FIG. 10, the pose information obtaining module 903 includes:

a horizontal deviation angle obtaining unit 1002, configured to obtain the horizontal deviation angle of the vehicle-mounted camera according to the way-points information.

In some embodiments, the horizontal deviation angle obtaining unit 1002 is specifically configured to obtain the horizontal deviation angle of the vehicle-mounted camera according to the way-points information and the focal length of the vehicle-mounted camera.

In some embodiments, the pose information of the vehicle-mounted camera includes a pitch angle of the vehicle-mounted camera.

In some embodiments, as illustrated in FIG. 9 and FIG. 10, the pose information obtaining module 903 includes:

a pitch angle obtaining unit 1003, configured to obtain the pitch angle of the vehicle-mounted camera according to the horizon information and the focal length of the vehicle-mounted camera.

In some embodiments, as illustrated in FIG. 9, the horizon information obtaining module 902 includes:

a lane line information obtaining unit 9021, configured to perform lane lines fitting according to the lane line detection result to obtain lane line information of at least two lane lines of the road;

a vanishing-point obtaining unit 9022, configured to obtain a vanishing-point of the lane lines according to the lane line information of the at least two lane lines; and a horizon information obtaining unit 9023, configured to obtain the horizon information according to the vanishing-point of the lane lines.

In some embodiments, the lane line information obtaining unit 9021 is specifically configured to: obtain lane line pixel points belonging to the lane lines according to the lane line detection result; and perform the lane lines fitting according to the lane line pixel points to obtain the lane line information of the at least two lane lines of the road.

In some embodiments, the horizon information obtaining unit 9023 is specifically configured to:

obtain a vanishing-point probabilistic graphic according to a vanishing-point of lane lines in each of multiple frames of images included in the video stream;

obtain a vanishing-point belonging to the horizon according to the vanishing-point probabilistic graphic; and obtain the horizon information according to the obtained vanishing-point belonging to the horizon.

According to the perspective principle, the lane lines intersect at the horizon. Therefore, the vanishing-point of the lane line functions falls on the horizon. Coordinates of the vanishing-point within the image are obtained according to the lane line functions. Exemplarily, when the lane lines are curves, a point of the lane line functions within a pixel coordinate range of the image is used as a vanishing-point of the lane line functions.

In some embodiments, as illustrated in FIG. 9, the vehicle-mounted camera pose estimation apparatus further includes: a vanishing-point obtaining module 905, configured to: obtain a vanishing-point belonging to the horizon according to a vanishing-point of at least two lane lines within each of multiple frames of images included in the video stream; and obtain a vanishing-point of the vehicle-mounted camera by performing averaging processing on the obtained vanishing-points belonging to the horizon.

In some embodiments, as illustrated in FIG. 9, the vehicle-mounted camera pose estimation apparatus further includes: the vanishing-point obtaining module 905, configured to: obtain a probability image of the lane lines according to at least two frames of images in the video stream, where the value of each pixel point in the probability image indicates the probability of the pixel point belonging to the lane line;

obtain lane line information of at least two lane lines according to the probability image; and obtain a vanishing-point of the vehicle-mounted camera according to the lane line information of the at least two lane lines.

Exemplarily, as illustrated in FIG. 9, the vehicle-mounted camera pose estimation apparatus further includes:

a camera calibration module 906, configured to calibrate the vehicle-mounted camera according to the pose information.

Exemplarily, as illustrated in FIG. 9, the vehicle-mounted camera pose estimation apparatus further includes:

a vehicle positioning module 907, configured to determine positioning information of the vehicle according to the pose information.

Figure 11:
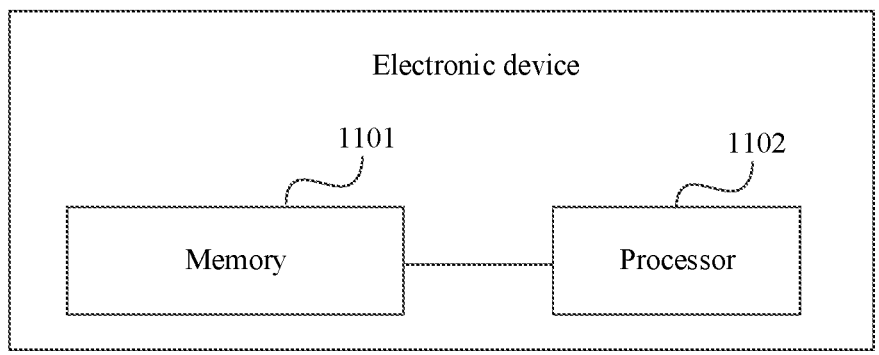
FIG. 11 is an entity block diagram of an electronic device provided by the embodiments of the present disclosure.

FIG. 11 is an entity block diagram of an electronic device provided by the embodiments of the present disclosure. As illustrated in FIG. 11, the electronic device includes:

a memory 1101, used for storing a program instruction; and a processor 1102, used for calling and executing the program instruction in the memory to execute operations of the method according to the method embodiments.

Figure 12:
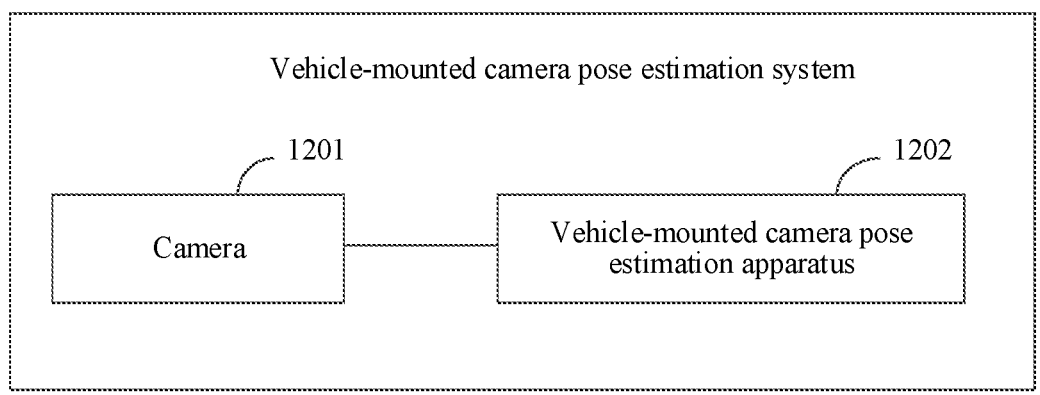
FIG. 12 is a schematic diagram of an architecture of a vehicle-mounted camera pose estimation system provided by the embodiments of the present disclosure.

FIG. 12 is a schematic diagram of an architecture of a vehicle-mounted camera pose estimation system provided by the embodiments of the present disclosure. The system is applied to a vehicle. As illustrated in FIG. 12, the system includes a camera 1201 mounted on a vehicle and a vehicle-mounted camera pose estimating apparatus 1202 connected to the camera 1201.

The embodiments of the present disclosure further provide a readable storage medium, in which a computer program is stored, where the computer program is used for executing operations of the method according to the method embodiments.

The embodiments of the present disclosure further provide a computer program product, including a computer instruction. When the computer instruction is run in a processor of a device, the operations of the method according to the method embodiments are implemented.

It should be understood that for the descriptions of the working processes, the setting modes, the technical effects, and the like of components, modules, or units of any of the vehicle-mounted camera pose estimation apparatuses, vehicle-mounted camera pose estimation systems, and electronic devices provided by the embodiments of the present disclosure, reference may be made to the corresponding descriptions of the method embodiments of the present disclosure, and details are not described herein again due to space limitation.

A person of ordinary skill in the art may understand that: all or some operations of implementing the forgoing method embodiments may be achieved by a program by instructing related hardware; the foregoing program can be stored in a computer readable storage medium; when the program is executed, operations including the foregoing method embodiments are executed. Moreover, the foregoing storage medium includes various media capable of storing program codes such as ROM, RAM, a magnetic disk, or an optical disk.

It should be explained at last that: the foregoing embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, and such modifications or replacements do not departing the essence of the corresponding technical solutions from the scope of the technical solutions of the embodiments of the present disclosure.

The invention claimed is:

1. A vehicle-mounted camera pose estimation method, comprising:
   performing lane line detection of a road on which a vehicle drives on the basis of a video stream of the road acquired by a vehicle-mounted camera;
   obtaining horizon information of the road according to a lane line detection result; and
   obtaining pose information of the vehicle-mounted camera according to the horizon information;

wherein the obtaining the horizon information of the road according to the lane line detection result comprises:
performing lane lines fitting according to the lane line detection result to obtain lane line information of at least two lane lines of the road;
obtaining a vanishing-point of the at least two lane lines according to the lane line information of the at least two lane lines; and
obtaining the horizon information according to the vanishing-point of the at least two lane lines;
wherein the performing lane lines fitting according to the lane line detection result to obtain lane line information of at least two lane lines of the road comprises:
obtaining lane line pixel points belonging to lane lines of the road according to the lane line detection result acquired through a convolutional neural network algorithm; and
performing the lane lines fitting according to the lane line pixel points to obtain lane line functions of the at least two lane lines,
wherein the obtaining the horizon information according to the vanishing-point of the at least two lane lines comprises:
obtaining a vanishing-point probabilistic graphic according to a vanishing-point of the at least two lane lines within each of multiple frames of images comprised in the video stream, wherein a value of each pixel point in the vanishing-point probabilistic graphic is a number of images, with the vanishing-point located at the pixel point, within the N frames of images, and N is a positive integer greater than 1;
obtaining a vanishing-point belonging to the horizon according to the vanishing-point probabilistic graphic; and
obtaining the horizon information according to the obtained vanishing-point belonging to the horizon.

2. The method according to claim 1, wherein the road is a structured road.

3. The method according to claim 1, wherein the pose information of the vehicle-mounted camera comprises a rotation angle of the vehicle-mounted camera, and the obtaining the pose information of the vehicle-mounted camera according to the horizon information comprises:
determining the rotation angle of the vehicle-mounted camera according to slope information of the horizon.

4. The method according to claim 1, wherein the obtaining the horizontal deviation angle of the vehicle-mounted camera according to the function of vehicle driving way-points comprises:
obtaining the horizontal deviation angle of the vehicle-mounted camera according to the function of vehicle driving way-points and a focal length of the vehicle-mounted camera.

5. The method according to claim 1, wherein the pose information of the vehicle-mounted camera comprises a pitch angle of the vehicle-mounted camera.

6. The method according to claim 1, wherein the obtaining the pose information of the vehicle-mounted camera according to the horizon information comprises:
obtaining a pitch angle of the vehicle-mounted camera according to the horizon information and a focal length of the vehicle-mounted camera.

7. The method according to claim 1, wherein the method further comprises:
obtaining a vanishing-point belonging to a horizon within each of multiple frames of images comprised in the video stream according to a vanishing-point of at least two lane lines within each of multiple frames of images comprised in the video stream; and
obtaining the visual vanishing-point of the vehicle-mounted camera by performing averaging processing on the obtained vanishing-point belonging to the horizon within each of multiple frames of images comprised in the video stream.

8. The method according to claim 1, wherein the method further comprises:
obtaining a probabilistic graphic of lane lines according to at least two frames of images in the video stream, wherein a value of each pixel point in the probabilistic graphic indicates a number of times that the pixel point belongs to a lane line in the N frames of images;
obtaining lane line information of at least two lane lines according to the probabilistic graphic; and
obtaining the vanishing-point of the vehicle-mounted camera according to the lane line information of the at least two lane lines.

9. The method according to claim 1, wherein the method further comprises at least one of the following:
calibrating the vehicle-mounted camera according to the pose information; or,
determining positioning information of the vehicle according to the pose information.

10. The method according to claim 1, wherein the vehicle-mounted camera is mounted at any position on front windshield glass of the vehicle.

11. The method according to claim 1, wherein the pose information of the vehicle-mounted camera comprises a horizontal deviation angle of the vehicle-mounted camera and the horizon information comprises a horizon function; and the obtaining the pose information of the vehicle-mounted camera according to the horizon information comprises:
obtaining way-points information of the vehicle according to the horizon information, wherein the way-points information comprises a function of vehicle driving way-points, the vehicle driving way-points are vertical to the horizon and a vanishing-point of the vehicle-mounted camera is located on the vehicle driving way-points; and
obtaining the horizontal deviation angle of the vehicle-mounted camera according to the function of vehicle driving way-points.

12. The method according to claim 11, wherein the obtaining the way-points information of the vehicle according to the horizon information comprises:
obtaining the way-points information of the vehicle according to the horizon information and the vanishing-point of the vehicle-mounted camera.

13. An electronic device, comprising:
memory, configured to store executable instructions; and
a processor, configured to call and execute the executable instructions in the memory to execute:
performing lane line detection of a road on which a vehicle drives on the basis of a video stream of the road acquired by a vehicle-mounted camera;
obtaining horizon information of the road according to a lane line detection result; and
obtaining pose information of the vehicle-mounted camera according to the horizon information;
wherein the obtaining the horizon information of the road according to the lane line detection result comprises:
performing lane lines fitting according to the lane line detection result to obtain lane line information of at least two lane lines of the road;

obtaining a vanishing-point of the at least two lane lines according to the lane line information of the at least two lane lines; and obtaining the horizon information according to the vanishing-point of the at least two lane lines;

wherein the performing lane lines fitting according to the lane line detection result to obtain lane line information of at least two lane lines of the road comprises:

obtaining lane line pixel points belonging to lane lines of the road according to the lane line detection result acquired through a convolutional neural network algorithm; and performing the lane lines fitting according to the lane line pixel points to obtain lane line functions of the at least two lane lines, wherein the obtaining the horizon information according to the vanishing-point of the at least two lane lines comprises:

obtaining a vanishing-point probabilistic graphic according to a vanishing-point of the at least two lane lines within each of multiple frames of images comprised in the video stream, wherein a value of each pixel point in the vanishing-point probabilistic graphic is a number of images, with the vanishing-point located at the pixel point, within the N frames of images, and N is a positive integer greater than 1;

obtaining a vanishing-point belonging to the horizon according to the vanishing-point probabilistic graphic; and obtaining the horizon information according to the obtained vanishing-point belonging to the horizon.

14. The device according to claim 13, wherein the road is a structured road.

15. The device according to claim 13, wherein the pose information of the vehicle-mounted camera comprises a rotation angle of the vehicle-mounted camera, and the obtaining the pose information of the vehicle-mounted camera according to the horizon information comprises:

determining the rotation angle of the vehicle-mounted camera according to slope information of the horizon.

16. The device according to claim 13, wherein the pose information of the vehicle-mounted camera comprises a horizontal deviation angle of the vehicle-mounted camera and the horizon information comprises a horizon function; and the obtaining the pose information of the vehicle-mounted camera according to the horizon information comprises:

obtaining way-points information of the vehicle according to the horizon information, wherein the way-points information comprises a function of vehicle driving way-points, the vehicle driving way-points are vertical to the horizon and a vanishing-point of the vehicle-mounted camera is located on the vehicle driving way-points; and obtaining the horizontal deviation angle of the vehicle-mounted camera according to the function of vehicle driving way-points.

17. A non-transitory readable storage medium, in which computer-readable instructions are stored, wherein execution of the computer-readable instructions by a processor causes the processor to execute:

performing lane line detection of a road on which a vehicle drives on the basis of a video stream of the road acquired by a vehicle-mounted camera;

obtaining horizon information of the road according to a lane line detection result; and obtaining pose information of the vehicle-mounted camera according to the horizon information;

wherein the obtaining the horizon information of the road according to the lane line detection result comprises:

performing lane lines fitting according to the lane line detection result to obtain lane line information of at least two lane lines of the road;

obtaining a vanishing-point of the at least two lane lines according to the lane line information of the at least two lane lines; and obtaining the horizon information according to the vanishing-point of the at least two lane lines;

wherein the performing lane lines fitting according to the lane line detection result to obtain lane line information of at least two lane lines of the road comprises:

obtaining lane line pixel points belonging to lane lines of the road according to the lane line detection result acquired through a convolutional neural network algorithm; and performing the lane lines fitting according to the lane line pixel points to obtain lane line functions of the at least two lane lines, wherein the obtaining the horizon information according to the vanishing-point of the at least two lane lines comprises:

obtaining a vanishing-point probabilistic graphic according to a vanishing-point of the at least two lane lines within each of multiple frames of images comprised in the video stream, wherein a value of each pixel point in the vanishing-point probabilistic graphic is a number of images, with the vanishing-point located at the pixel point, within the N frames of images, and N is a positive integer greater than 1;

obtaining a vanishing-point belonging to the horizon according to the vanishing-point probabilistic graphic; and obtaining the horizon information according to the obtained vanishing-point belonging to the horizon.

18. The non-transitory readable storage medium according to claim 17, wherein the pose information of the vehicle-mounted camera comprises a horizontal deviation angle of the vehicle-mounted camera and the horizon information comprises a horizon function; and the obtaining the pose information of the vehicle-mounted camera according to the horizon information comprises:

obtaining way-points information of the vehicle according to the horizon information, wherein the way-points information comprises a function of vehicle driving way-points, the vehicle driving way-points are vertical to the horizon and a vanishing-point of the vehicle-mounted camera is located on the vehicle driving way-points; and obtaining the horizontal deviation angle of the vehicle-mounted camera according to the function of vehicle driving way-points.

* * * * *